(12) United States Patent
Feng

(10) Patent No.: US 6,517,093 B2
(45) Date of Patent: Feb. 11, 2003

(54) FOLDABLE TRICYCLE

(75) Inventor: Pin-Chieh Feng, Chang Hua Hsien (TW)

(73) Assignee: Melton International L.L.C., Dover, DE (US)

( * ) Notice: Subject to any disclaimer, the term of this patent is extended or adjusted under 35 U.S.C. 154(b) by 69 days.

(21) Appl. No.: 09/760,301

(22) Filed: Jan. 16, 2001

(65) Prior Publication Data

US 2002/0063411 A1 May 30, 2002

(30) Foreign Application Priority Data

Nov. 29, 2000 (TW) ...................................... 89220836 U

(51) Int. Cl.⁷ ............................................... B62M 1/00
(52) U.S. Cl. ................................. 280/87.042; 280/87.05
(58) Field of Search ............................... 280/62, 87.01, 280/87.021, 87.041, 87.042, 87.05, 655, 655.1

(56) References Cited

U.S. PATENT DOCUMENTS 6,173,976 B1 * 1/2001 Lee ........................ 280/87.05
6,182,988 B1 * 2/2001 Wu ......................... 280/87.05
6,220,612 B1 * 4/2001 Beleski, Jr. ............. 280/87.041
6,234,501 B1 * 5/2001 Chen ..................... 280/87.041
6,244,605 B1 * 6/2001 Liu ........................ 280/87.041
6,270,095 B1 * 8/2001 Chang .................... 280/87.041
6,270,097 B1 * 8/2001 Lin ......................... 280/87.05
6,283,485 B1 * 9/2001 Tsai ........................ 280/87.05
6,286,845 B1 * 9/2001 Lin ......................... 280/87.05
6,318,741 B1 * 11/2001 Chen .................... 280/87.041

* cited by examiner

Primary Examiner—Lesley D. Morris
Assistant Examiner—L. Lum
(74) Attorney, Agent, or Firm—Browdy and Neimark

(57) ABSTRACT

A foldable tricycle comprises two footboards which are formed of a front tube and a rear tube. A folding mechanism is disposed between the front tube and the rear tube and is formed of a pivoting plate extending from the rear end of the front tube, a pivoting seat extending from the front end of the rear tube, and at least one locating member disposed on the pivoting seat. The pivoting plate is pivoted with the pivoting seat such that they are detachably located by the locating member at two opposite positions, thereby enabling the tricycle to be folded.

18 Claims, 8 Drawing Sheets

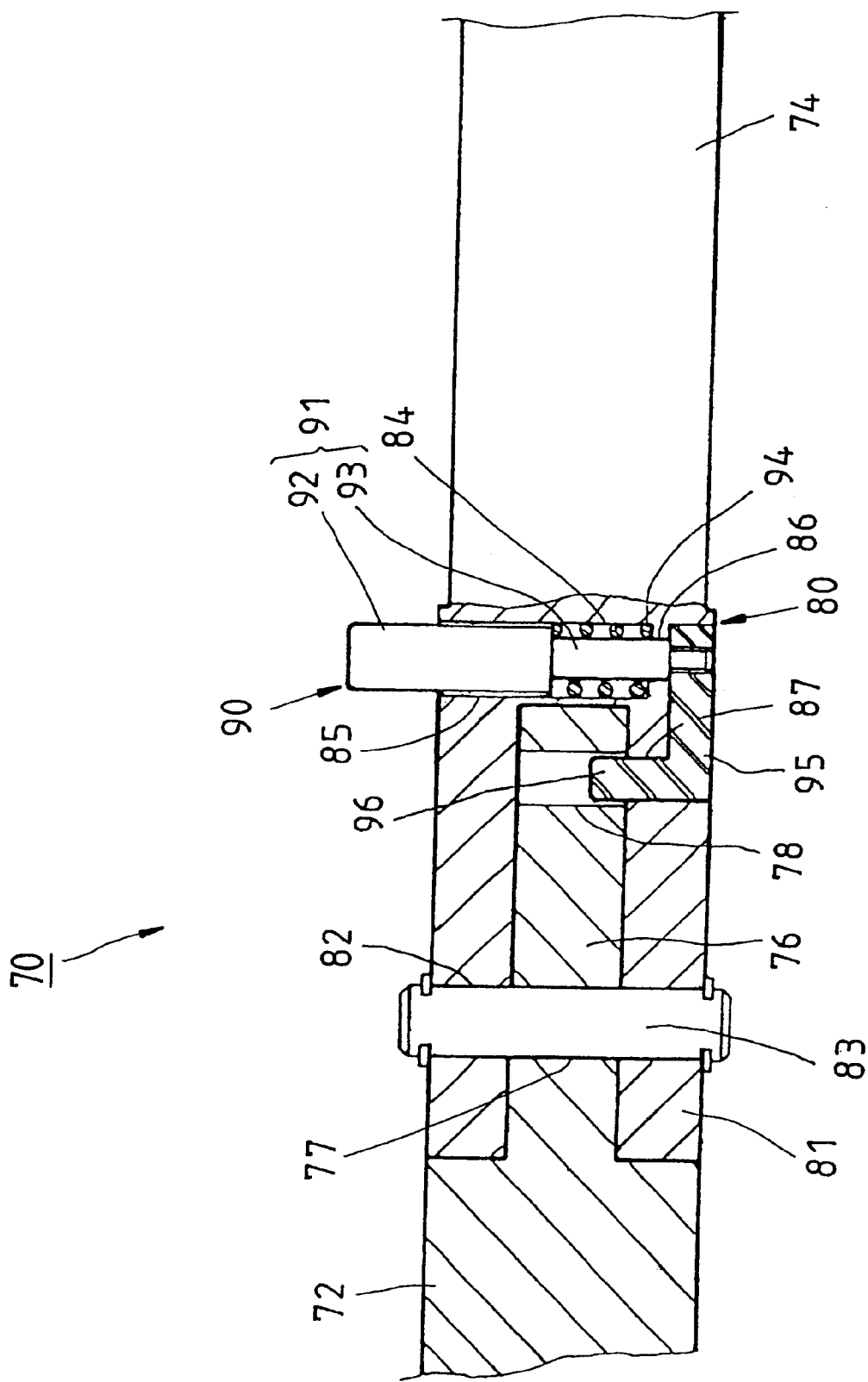

FOLDABLE TRICYCLE

FIELD OF THE INVENTION

The present invention relates generally to a tricycle, and more particularly to a foldable tricycle.

BACKGROUND OF THE INVENTION

The conventional tricycle comprises a handlebar frame, a front wheel pivoted with the bottom end of the handlebar frame, two footboards pivoted at the front end with the handlebar frame, two rear wheels pivoted to the rear ends of the two footboards, and a swiveling member pivoted between the handlebar frame and the footboards. The conventional tricycle is so cumbersome that it can not be easily stored or transported.

SUMMARY OF THE INVENTION

The primary objective of the present invention is to provide a tricycle which can be folded with ease and speed to facilitate the storage and the transportation of the tricycle.

It is another objective of the present invention to provide a tricycle which can be folded with precision.

The tricycle of the present invention comprises a handlebar frame, a front wheel, two footboards, two rear wheels, a swiveling member, and a folding mechanism. The footboards comprises a front tube and a rear tube. The folding mechanism is disposed between the front tube and the rear tube and is formed of a pivoting plate, a pivoting seat, and at least one locating member. The pivoting plate is extended from the rear end of the front tube and is provided with a first pivoting hole, a first locating hole, and a second locating hole. The pivoting seat comprises two side plates which are extended from the front end of the rear tube such that the side plates are separated from each other by a predetermined distance for receiving therebetween the pivoting plate. The side plates are provided with a second pivoting hole. The pivoting plate is pivoted with the pivoting seat by a first spindle, which is put through the first pivoting hole and the second pivoting holes. The locating member is disposed on the pivoting seat for locating the pivoting plate and the pivoting seat at two opposite positions.

BRIEF DESCRIPTION OF THE DRAWINGS

FIG. 10 shows a sectional view of the third preferred embodiment of the present invention.

DETAILED DESCRIPTION OF THE INVENTION

Figure 1:
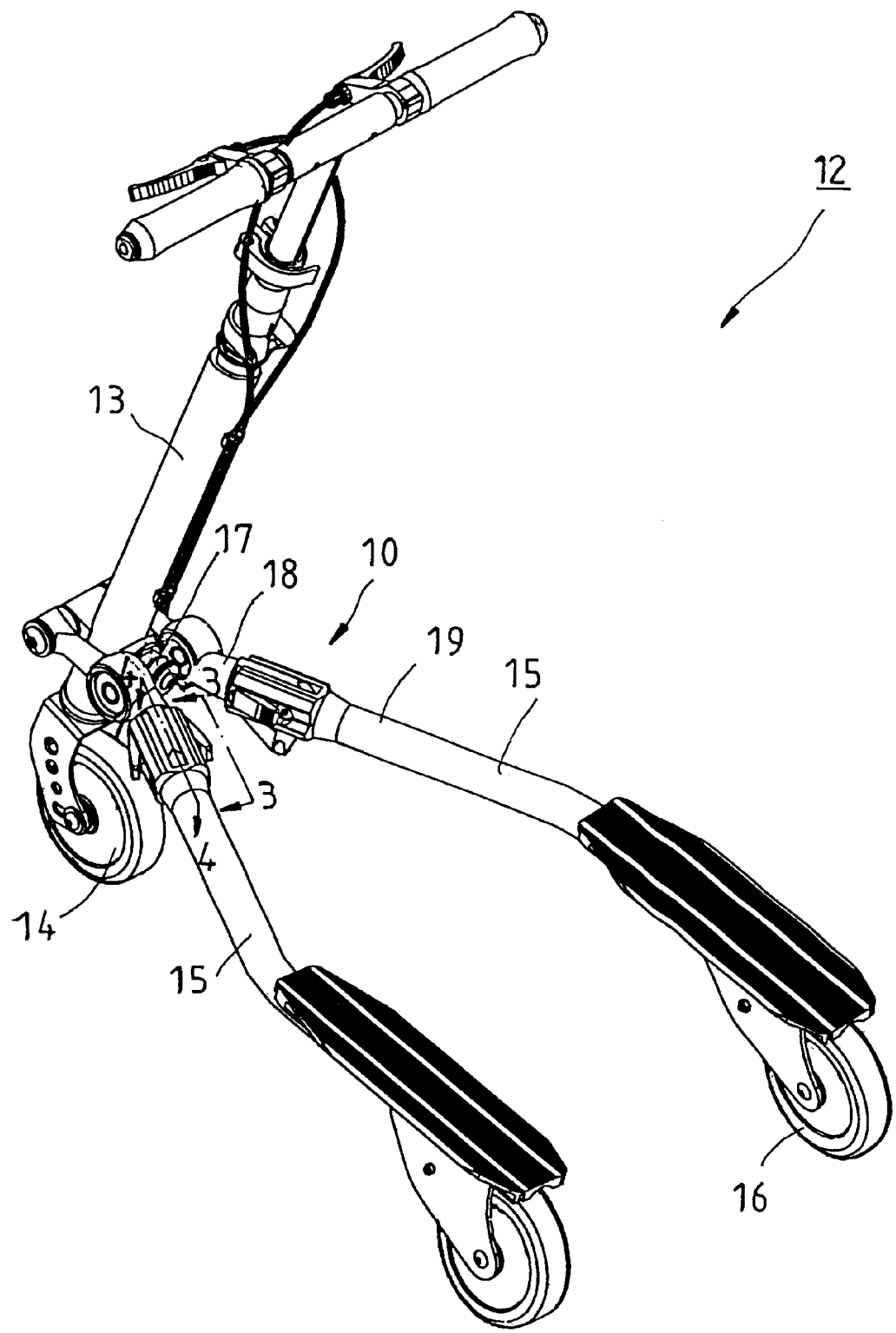
FIG. 1 shows a perspective view of a first preferred embodiment of the present invention.
Figure 2:
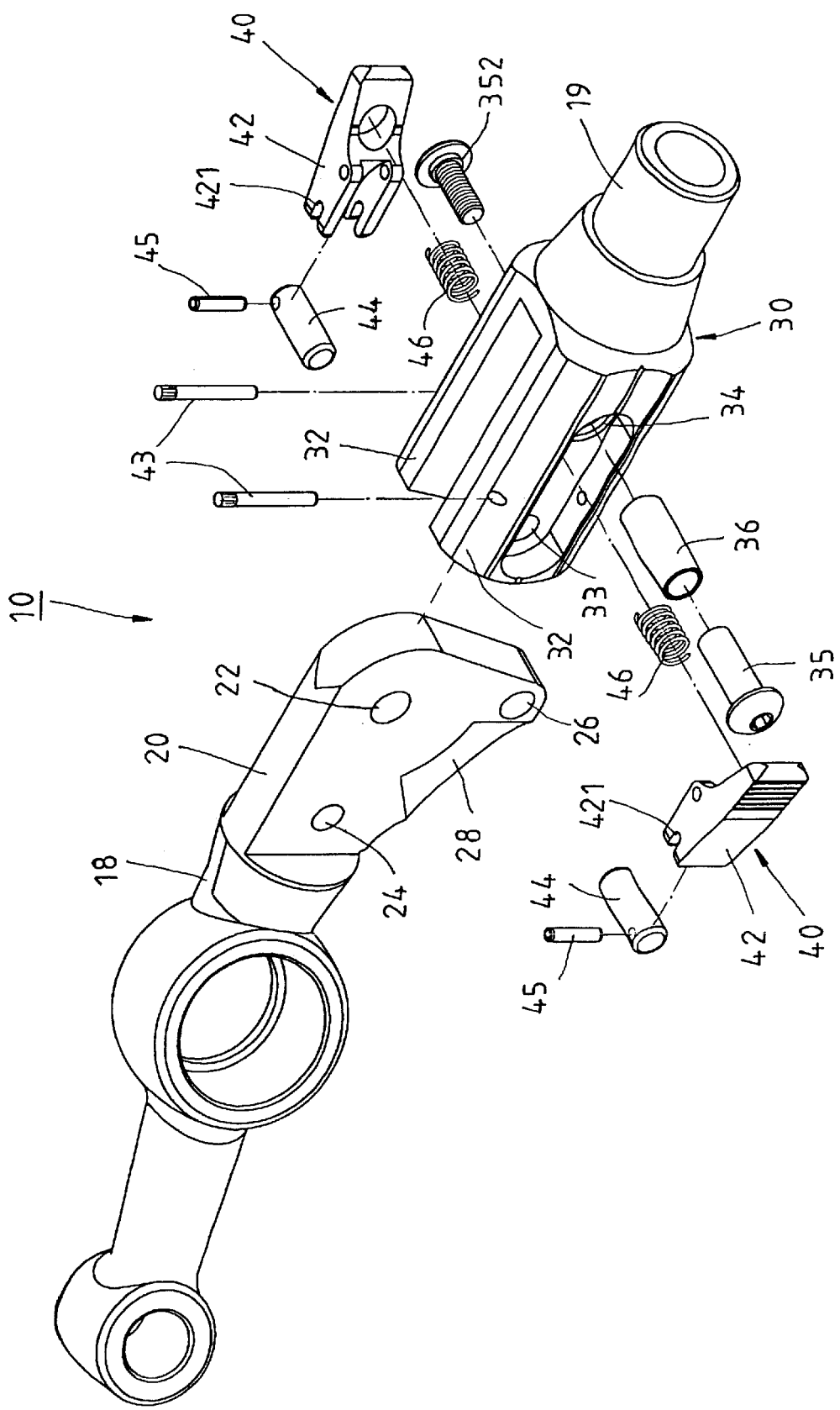
FIG. 2 shows an exploded view of the folding mechanism of the first preferred embodiment of the present invention.
Figure 3:
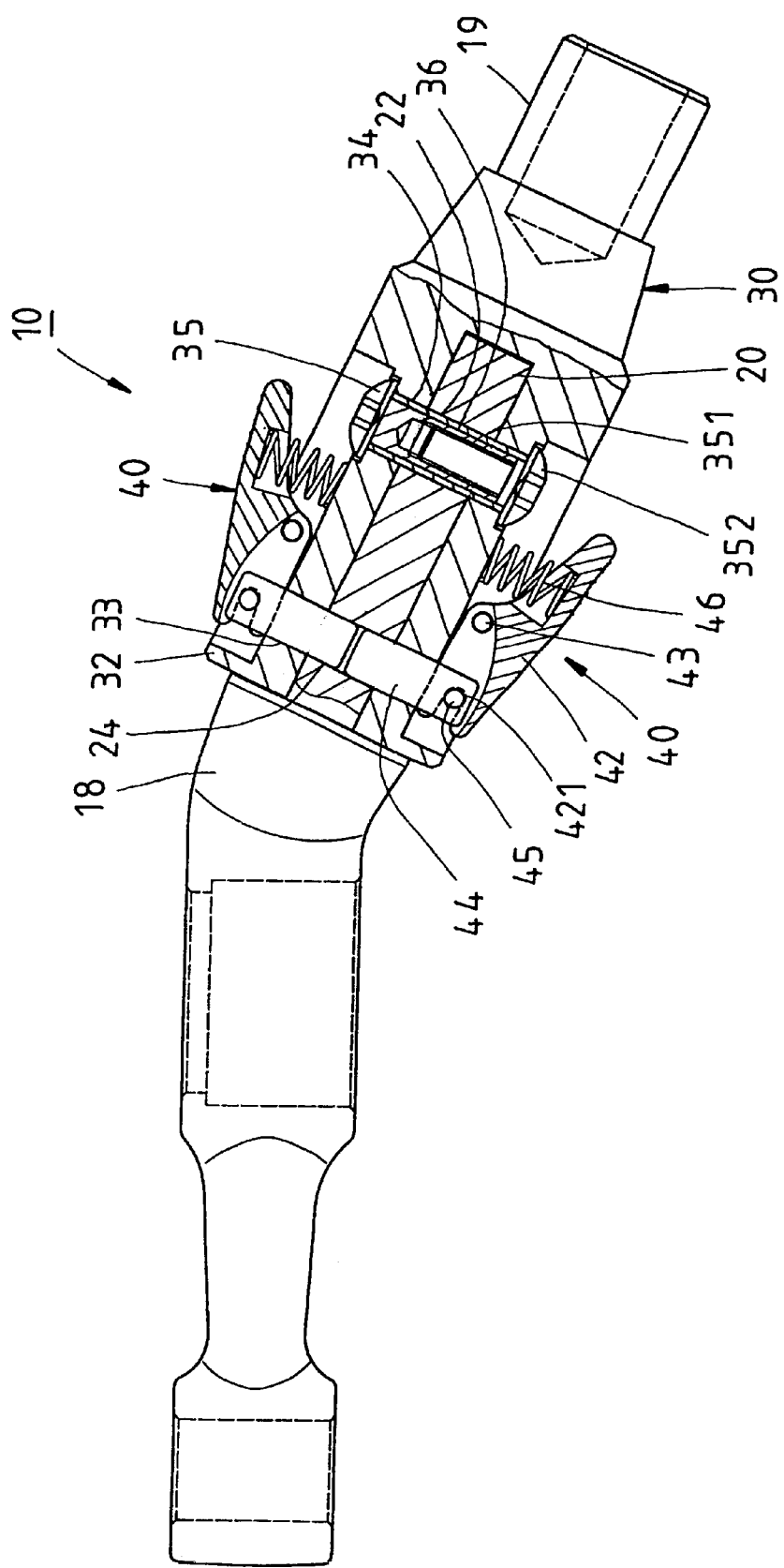
FIG. 3 shows a sectional view taken along the direction indicated by a line 3—3 as shown in FIG. 1.
Figure 4:
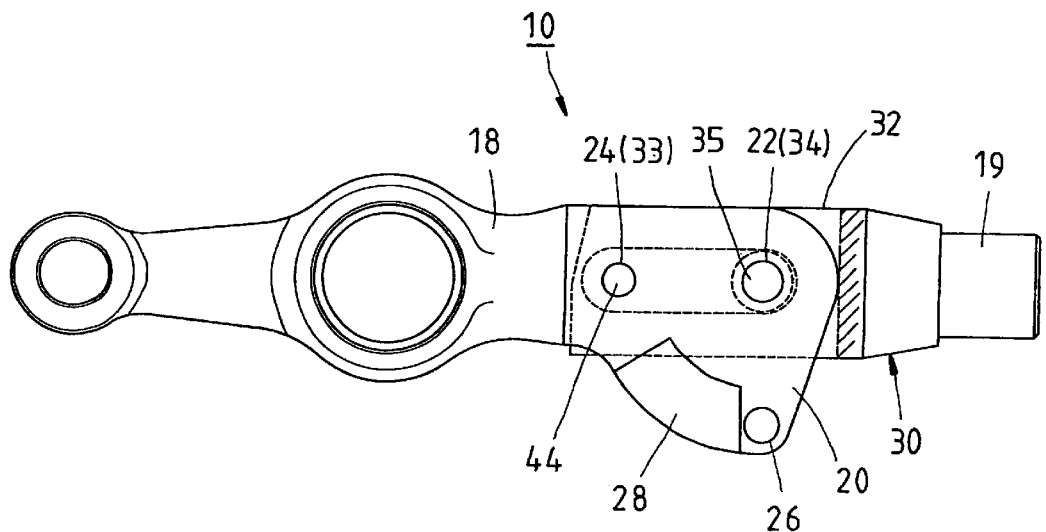
FIG. 4 shows a sectional view taken along the direction indicated by a line 4—4 as shown in FIG. 1.

As shown in FIGS. 1–4, a foldable tricycle 12 embodied in the present invention is formed of a handlebar frame 13, a front wheel 14 pivoted to the bottom end of the handlebar frame 13, two footboards 15 comprising a rear tube 19 and a front tube 18 pivoted at the front end with the handlebar frame 13, two rear wheels 16 pivoted respectively to the rear ends of the two rear tubes 19, a swiveling member 17 pivoted to the rear end of the handlebar frame 13 and connected with the two front tubes 18, and a folding mechanism 10 mounted between the front tube 18 and the rear tube 19. The folding mechanism 10 comprises a pivoting plate 20, a pivoting seat 30, and two locating members 40.

The pivoting plate 20 is of a trapezoidal construction and is extended from the rear end of the front tube 18. The pivoting plate 20 is provided with a first pivoting hole 22, a first locating hole 24, and a second locating hole 26. The first locating hole 24 and the second locating hole 26 are equidistantly separated from the first pivoting hole 22. The pivoting plate 20 is provided in two sides with a guide portion 28 which is of a recessed construction and is located between the first locating hole 24 and the second locating hole 26. The guide portion 28 is in fact an arcuate recess.

The pivoting seat 30 comprises two side plates 32, which are extended from the front end of the rear tube 19 such that the two side plates 32 are parallel to each other at an interval for disposing therebetween the pivoting plate 20. The two side plates 32 are provided with a through hole 33 and a second pivoting hole 34. The pivoting plate 20 is pivoted with the pivoting seat 30 by a first spindle 35, which is put through the first pivoting hole 22 and the second pivoting holes 34. The first spindle 35 is provided with a sleeve 36 fitted thereover for reducing friction. The first spindle 35 is provided with an inner threaded portion 351, which is engaged with a bolt 352 for securing the first spindle 35 in place.

The locating members 40 are respectively disposed on the two side plates 32 and are formed of a press button 42 which is pivoted with the side plates 32 by a second spindle 43, an insertion pin 44 pivoted with one end of the press button 42 by a third spindle 45 such that the insertion pin 44 is put through the through hole 33 and the first locating hole 24, and an elastic member 46 which is a spring urging at one end thereof the side plates 32 and at other end thereof the other end of the press button 42. The press button 42 is provided at one end with a slot 421 of a predetermined depth. The third spindle 45 is slidably disposed in the slot 421. In light of the insertion pin 44 being allowed to displace only in the hole center direction of the through hole 33, when the press button 42 is turned, the third spindle 45 is allowed to slide back and forth in the slot 421. In consideration of the product cost or other pertinent factors, only one side plate 32 is provided with one locating member 40.

Figure 5:
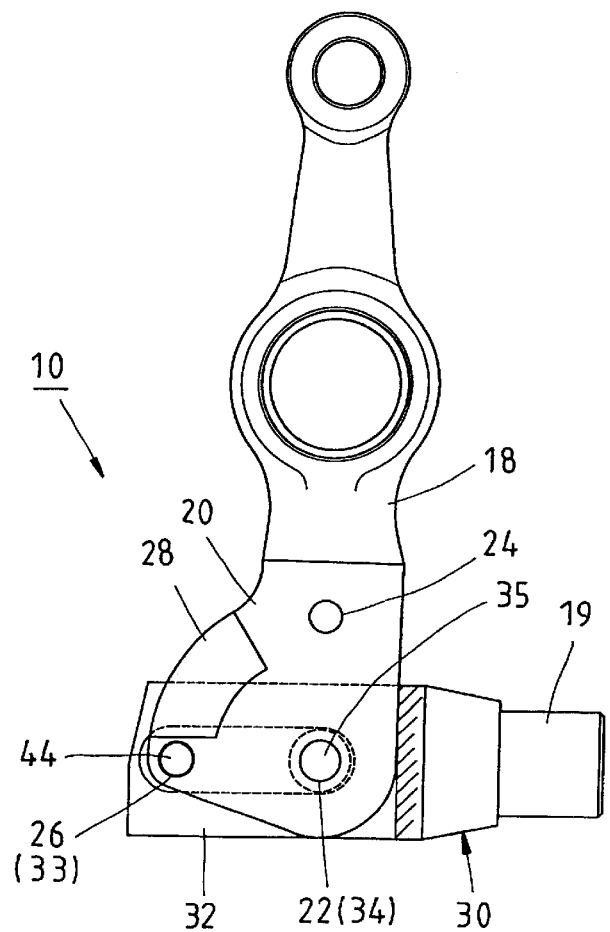
FIG. 5 shows a schematic view of the first preferred embodiment of the present invention in action.
Figure 6:
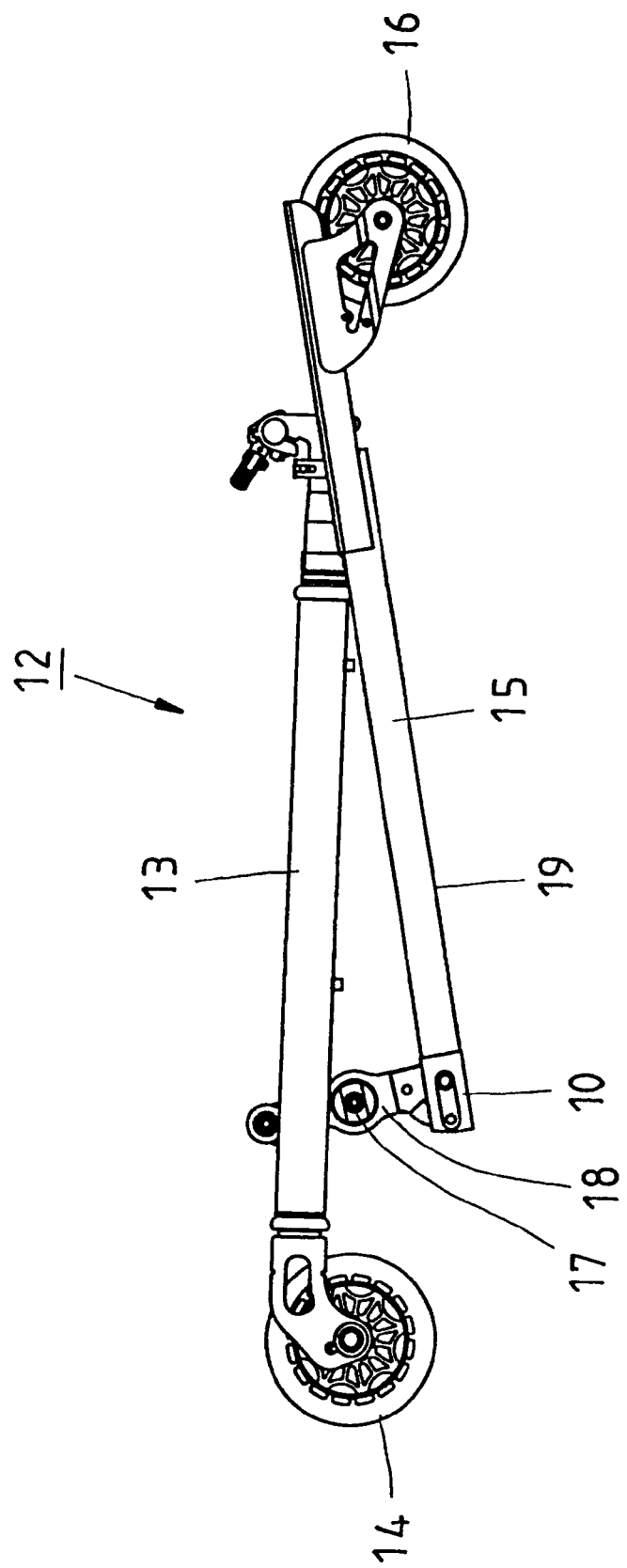
FIG. 6 shows a schematic view of the first preferred embodiment of the present invention in the folding state.

The tricycle 12 is folded by pressing the press button 42, so as to cause the insertion pin 44 to move away from the first locating hole 24 of the pivoting plate 20. As a result, the front tube 18 and the rear tube 19 can be bent. In the meantime, the press button 42 is relieved of the pressure to allow the press button 42 to be forced by the recovery force of the spring 46 to return to its original position, thereby enabling the free end of the insertion pin 44 to urge the guide portion 28 of the pivoting plate 20. In light of the guide portion 28 being an arcuate recess, when the guide portion 28 is urged by the insertion pin 44, the deformity of the spring 46 is greatly reduced. In the meantime, the positive direction force exerting on the pivoting plate 20 by the insertion pin 44 and the friction between the pivoting plate 20 and the insertion pin 44 are also reduced. For this reason, the guide portion 28 is capable of reducing effectively the friction that is brought about at the time when the front tube 18 and the rear tube 19 are turned in relation to each other. As the front tube 18 and the rear tube 19 are turned and located, the insertion pin 44 is forced by the spring force of the spring 46 to insert into the second locating hole 26, as shown in FIGS. 5 and 6. The process of folding the tricycle 12 is thus completed with ease and speed.

Figures 7, 8:
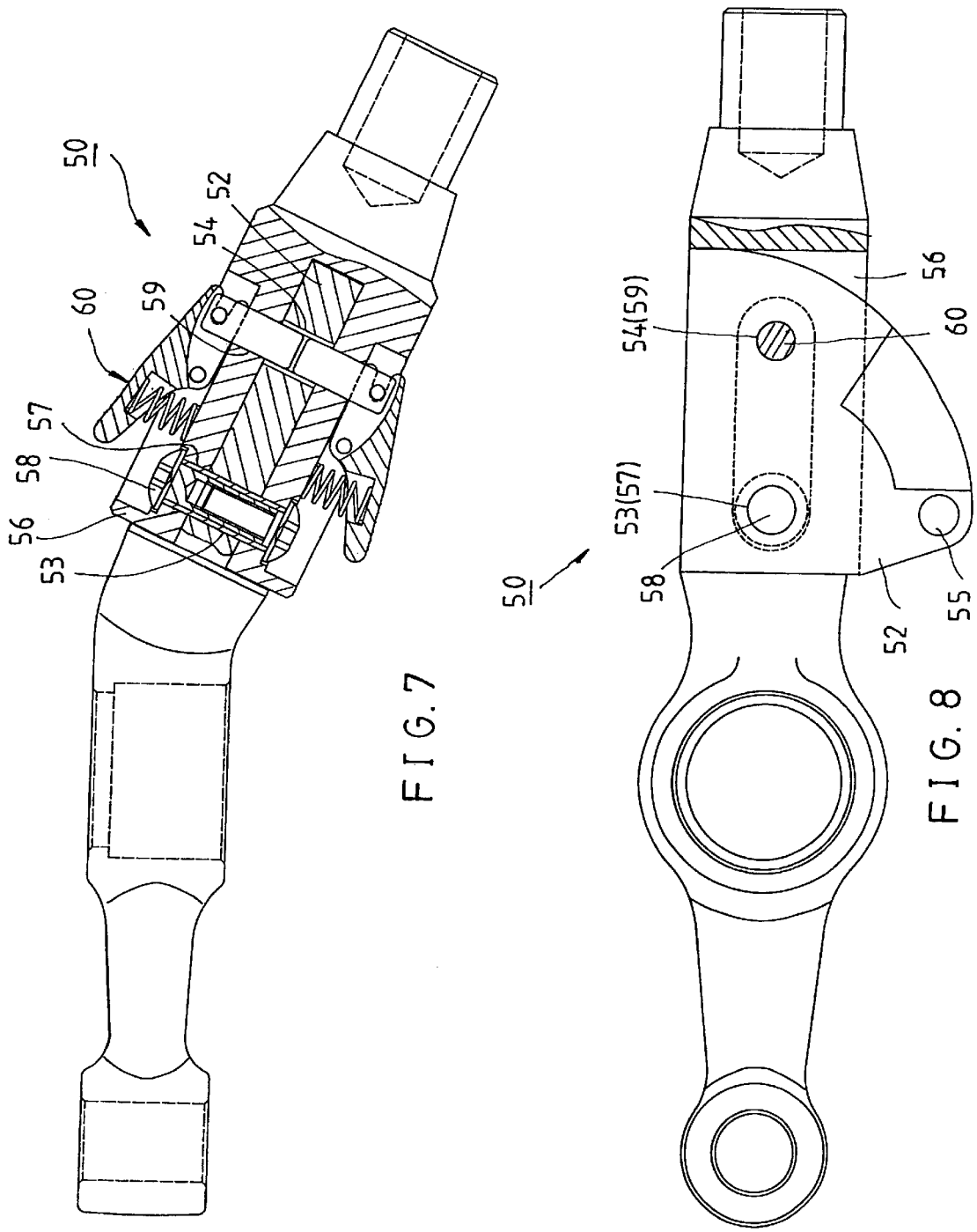
FIG. 7 shows a sectional view of a second preferred embodiment of the present invention.
FIG. 8 shows another sectional view of the second preferred embodiment of the present invention.

As shown in FIGS. 7 and 8, a folding mechanism 50 of the second preferred embodiment of the present invention comprises a pivoting plate 52 with a first pivoting hole 53, a first locating hole 54, and a second locating hole 55, which are different in location from the counterparts of the pivoting plate 20 of the first preferred embodiment described above. Accordingly, the second pivoting hole 57 and the first spindle 58 of the side plates 56 of the second preferred embodiment of the present invention are different in location from the counterparts of the first preferred embodiment described above. The positions of the through hole 59 and the locating members 60 should be also changed accordingly.

Figure 9:
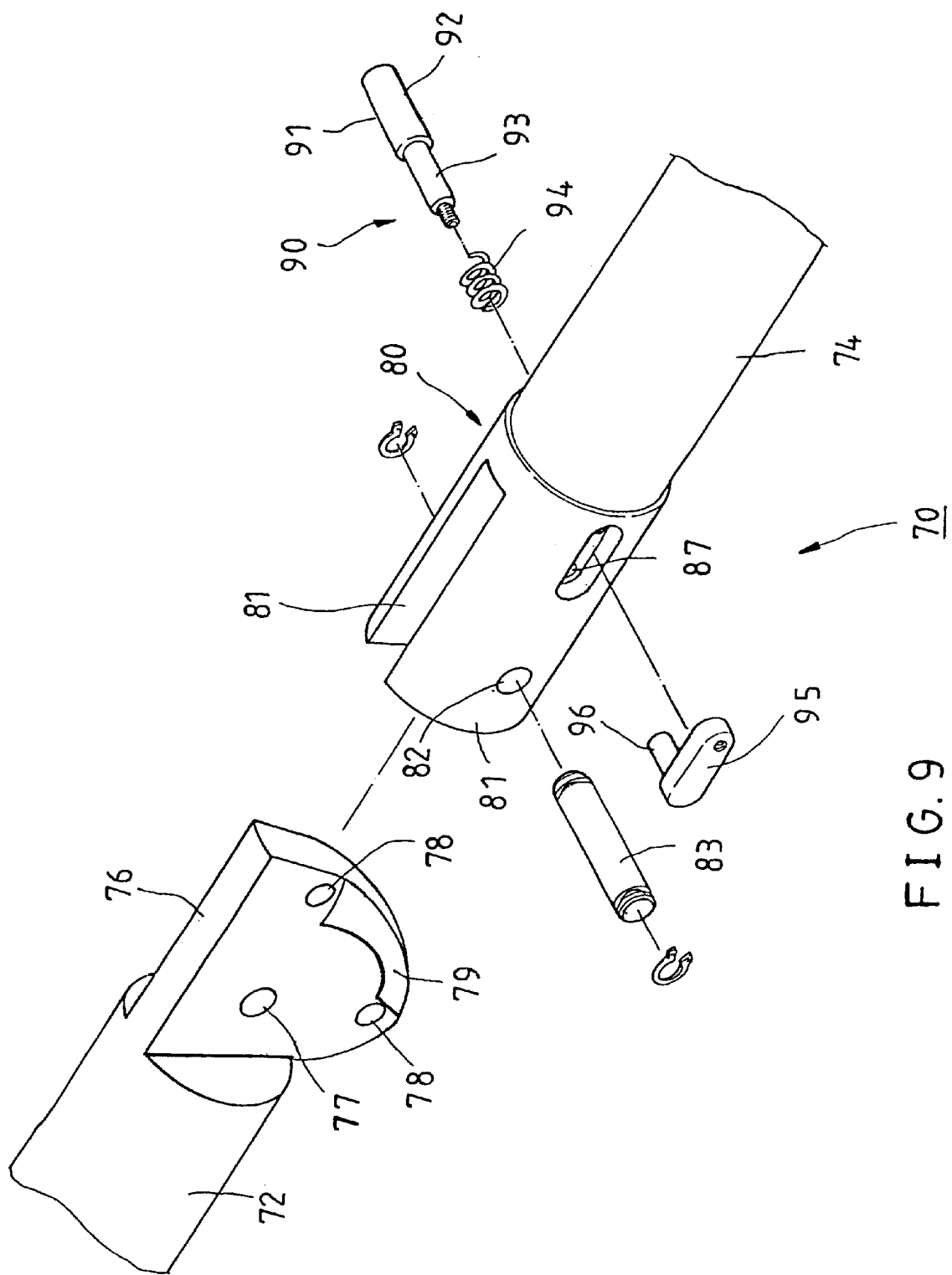
FIG. 9 shows an exploded view of a third preferred embodiment of the present invention.

As shown in FIGS. 9 and 10, a folding mechanism 70 of the third preferred embodiment of the present invention is disposed between the front tube 72 and the rear tube 74 and is formed of a pivoting plate 76, a pivoting seat 80, and a locating member 90.

The pivoting plate 76 is disposed on the front tube 72 and is formed of a first pivoting hole 77, two locating holes 78, and two guide portions 79.

The pivoting seat 80 is disposed on the rear tube 74 and is formed of two side plates 81 which are provided with a second pivoting hole 82 and a first spindle 83. The pivoting plate 76 is pivoted with the pivoting seat 80 by the first spindle 83, which is put through the first pivoting hole 77 and the second pivoting hole 82. The pivoting seat 80 is further provided with a stepped hole 84, and a through hole 87 which is located in one side plate 81 of the pivoting seat 80. The stepped hole 84 has a large diametrical section 85 and a small diametrical section 86.

The locating member 90 is formed of a press rod 91, a spring 94 disposed in the large diametrical section 85, and a retaining piece 95. The press rod 91 has a head 92 and a shank 93 over which the spring 94 is fitted. The retaining piece 95 is disposed on the free end of the shank 93 of the press rod 91 and has an insertion pillar 96, which is received in the through hole 87 and one of the locating holes 78 for retaining the pivoting plate 76 and the pivoting seat 80.

As the press rod 91 is pressed, the insertion pillar 96 of the retaining piece 95 moves away from the locating hole 78, thereby enabling the front tube 72 and the rear tube 74 to be bent until such time when the insertion pillar 96 is inserted into other one of the locating holes 78.

What is claimed is:

1. A foldable tricycle comprising:
   a handlebar frame;
   a front wheel pivoted to a bottom end of said handlebar frame;
   two footboards each comprising a front tube and a rear tube, with each said front tube being pivoted at a front end thereof with said handlebar frame;
   two rear wheels pivoted respectively to a rear end of each said rear tube;
   a swiveling member pivoted with said handlebar frame and connected with each said front tube of said two footboards; and
   a folding mechanism engaged between a rear end of each said front tube and a front end of each said rear tube having means to allow rotation of said front tube and said rear tube between an operating position and a storage position.

2. The foldable tricycle as defined in claim 1, wherein said folding mechanism comprises:
   a pivoting plate extended from the rear end of each said front tube and provided with a first pivoting hole, a first locating hole, and a second locating hole whereby said first locating hole and said second locating hole are equidistantly separated from said first pivoting hole;
   a pivoting seat comprising two side plates extending from the front end of each said rear tube such that said two side plates are separated from each other by a predetermined distance, said two side plates being provided with a second pivoting hole, said pivoting plate being pivoted between said two side plates of said pivoting seat by a first spindle which extends through said first pivoting hole of said pivoting plate and said second pivoting holes of said two side plates of said pivoting seat; and
   at least one locating member disposed on said pivoting seat for fixing said pivoting plate and said pivoting seat together at the operating position and the storage position.

3. The foldable tricycle as defined in claim 2, wherein one of said two side plates of said pivoting seat is provided with a through hole; wherein said locating member is disposed on said one side plate and is formed of a press button pivoted with said one side plate, an insertion pin pivoted with one end of said press button such that said insertion pin is put through said through hole of said one side plate and said first locating hole, and an elastic member urging at one end thereof said one side plate and at other end thereof other end of said press button.

4. The foldable tricycle as defined in claim 3, wherein said press button is provided at one end with a slot having a predetermined depth; wherein said insertion pin is pivoted with said press button by a third spindle whereby said third spindle is slidably disposed in said slot of said press button.

5. The foldable tricycle as defined in claim 3 comprising two locating members whereby said two locating members are disposed on said two side plates, said two side plates being provided with a through hole.

6. The foldable tricycle as defined in claim 3, wherein said elastic member is a spring.

7. The foldable tricycle as defined in claim 2, wherein said pivoting plate is further provided with a guide portion whereby said guide portion is located between said first locating hole and said second locating hole.

8. The foldable tricycle as defined in claim 2, wherein said pivoting plate is provided in two sides with a guide portion whereby said guide portion is located between said first locating hole and said second locating hole.

9. The foldable tricycle as defined in claim 2, wherein said pivoting seat is provided with a stepped hole; wherein one of said side plates of said pivoting seat is further provided with a through hole; wherein said locating member is formed of a press rod and a retaining piece disposed at one end of said press rod, said press rod being provided with a spring fitted thereover and being received in said stepped hole, said retaining piece having an insertion pillar which is put through said through hole and said first locating hole for retaining said pivoting plate and said pivoting seat.

10. The foldable tricycle as defined in claim 9, wherein said press rod has a head and a shank; wherein said spring is fitted over said shank of said press rod; wherein said stepped hole is formed of a large diametrical section and a small diametrical section; wherein said press rod is received in said stepped hole in such a manner that said press rod and said spring are received in said large diametrical section, and that said shank of said press rod is received in said small diametrical section; and wherein said retaining piece is disposed at a free end of said shank of said press rod.

11. A foldable tricycle comprising:

a handlebar frame;

a front wheel pivoted to a bottom end of said handlebar frame;

two footboards each comprising a front tube and a rear tube, with each said front tube being pivoted at a front end thereof with said handlebar frame;

two rear wheels pivoted respectively to a rear end of each said rear tube;

a swiveling member pivoted with said handlebar frame and connected with each said front tube of said two footboards;

a folding mechanism engaged between a rear end of each said front tube and a front end of each said rear tube having means to allow rotation of said front tube and said rear tube between an operating position and a storage position;

a pivoting plate extended from the rear end of each said front tube and provided with a first pivoting hole, a first locating hole, and a second locating hole whereby said first locating hole and said second locating hole are equidistantly separated from said first pivoting hole;

a pivoting seat comprising two side plates extending from the front end of each said rear tube such that said two side plates are separated from each other by a predetermined distance, said two side plates being provided with a second pivoting hole, said pivoting plate being pivoted between said two side plates of said pivoting seat by a first spindle which extends through said first pivoting hole of said pivoting plate and said second pivoting holes of said two side plates of said pivoting seat; and at least one locating member disposed on said pivoting seat for fixing said pivoting plate and said pivoting seat together at the operating position and the storage position;

wherein one of said two side plates of said pivoting seat is provided with a through hole; wherein said locating member is disposed on said one side plate and is formed of a press button pivoted with said one side plate, an insertion pin pivoted with one end of said press button such that said insertion pin is put through said through hole of said one side plate and said first locating hole, and an elastic member urging at one end thereof said one side plate and at other end thereof other end of said press button.

12. The foldable tricycle as defined in claim 11, wherein said pivoting plate is further provided with a guide portion whereby said guide portion is located between said first locating hole and said second locating hole.

13. The foldable tricycle as defined in claim 11, wherein said pivoting plate is provided in two sides with a guide portion whereby said guide portion is located between said first locating hole and said second locating hole.

14. The foldable tricycle as defined in claim 11, wherein said press button is provided at one end with a slot having a predetermined depth; wherein said insertion pin is pivoted with said press button by a third spindle whereby said third spindle is slidably disposed in said slot of said press button.

15. The foldable tricycle as defined in claim 11 comprising two locating members whereby said two locating members are disposed on said two side plates, said two side plates being provided with a through hole.

16. The foldable tricycle as defined in claim 11, wherein said elastic member is a spring.

17. The foldable tricycle as defined in claim 11, wherein said pivoting seat is provided with a stepped hole; wherein one of said side plates of said pivoting seat is further provided with a through hole; wherein said locating member is formed of a press rod and a retaining piece disposed at one end of said press rod, said press rod being provided with a spring fitted thereover and being received in said stepped hole, said retaining piece having an insertion pillar which is put through said through hole and said first locating hole for retaining said pivoting plate and said pivoting seat.

18. The foldable tricycle as defined in claim 17, wherein said press rod has a head and a shank; wherein said spring is fitted over said shank of said press rod; wherein said stepped hole is formed of a large diametrical section and a small diametrical section; wherein said press rod is received in said stepped hole in such a manner that said press rod and said spring are received in said large diametrical section, and that said shank of said press rod is received in said small diametrical section; and wherein said retaining piece is disposed at a free end of said shank of said press rod.

* * * * *